March 7, 1967 G. KLAIBER 3,308,347

COMPUTER PATCH BAY FORMED OF A PLURALITY OF BASE BLOCKS

Filed Oct. 22, 1965 2 Sheets-Sheet 1

INVENTOR.
GERHART KLAIBER
BY
Allan Ratner

COMPUTER PATCH BAY FORMED OF A PLURALITY OF BASE BLOCKS

Filed Oct. 22, 1965 2 Sheets-Sheet 2

INVENTOR.
GERHART KLAIBER
BY
Allan Ratner

United States Patent Office 3,308,347
Patented Mar. 7, 1967

3,308,347
COMPUTER PATCH BAY FORMED OF A PLURALITY OF BASE BLOCKS

Gerhart Klaiber, Monmouth County, N.J., assignor to Electronic Associates Inc., Long Branch, N.J., a corporation of New Jersey Filed Oct. 22, 1965, Ser. No. 501,835
8 Claims. (Cl. 317—99)

This invention relates to contact shielding structure and more particularly to a patching arrangement for a computer.

It has been known to interconnect the differing computing elements of a general purpose computer and particularly an analog computer by means of plug-in interconnections or patch cords. In specific applications, a central patch bay has been provided which includes spring contact assemblies connected to each of the computing elements. The actual patching of the patch cords is done on a removeable prepatch panel. The prepatch panel may then be plugged into the patch bay and in this manner the computing elements are interconnected one with another by way of the patch cords. Thus the prepatch panel may be removed from the patch bay, stored for later use and another prepatch panel with a different patching arrangement inserted into the patch bay.

Many prior patch bays have been made of a single sheet of material having openings into which contact assemblies have been mounted. However there have been problems in the electrical shielding of the contact assemblies one with the other so that crosstalk has been produced as generally described in Electronic Anaog and Hybrid Computers, by Korn and Korn, McGraw-Hill, 1964, at chapter 11. In addition, electrical shielding problems occur in rapid or high speed switching since high frequency switching components are generated. In addition, in such prior patch bays contact assemblies were not mechanically shielded or protected in the patch bay so that they might easily be bent or otherwise damaged by the operating and repair personnel. A further problem in many prior patch bays has been that it has not been possible to achieve accurate tolerances between individual contact assemblies. Accordingly this has caused difficulties in properly aligning the contact assemblies in the patch bay.

Accordingly an object of the present invention is to provide electrical and mechanical shielding for spring contact assemblies in a patch bay.

Another object of the present invention is a shielded patching system which provides accurate alignment of the contact assemblies in the patch bay with respect to the patch cords.

In accordance with the present invention there is provided a computer patch bay for receiving a prepatch panel and formed of a plurality of multicavity base blocks. Each of the base blocks has one longitudinal wall formed across one longitudinal edge of the block while the other longitudinal edge is unwalled or open. At least one longitudinal divider is formed between the longitudinal edges of the block. In addition each of the base blocks has a transverse wall formed across each transverse edge of the block and at least one transverse divider formed between the transverse walls. Thus there are formed recesses or cavities in the base block and a spring contact assembly is secured within each of the recesses. To make up the patch bay the base blocks are disposed adjacent each other with the unwalled edge of each base block disposed adjacent the longitudinal wall of the next succeeding base block. In this manner, the contact assemblies are each electrically shielded and mechanically protected and the assemblies in differing base blocks are exactly aligned one with the other and also with respect to the patch cord tips in the prepatch panel.

For further objects and advantages of the inventions, and for a more detailed discussion of its component parts and its manner of operation, reference is to be had to the following description taken in conjunction with the accompanying drawings in which.

Figure 1:
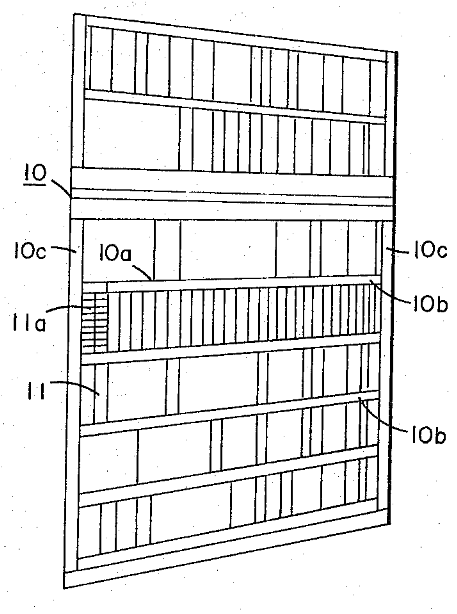
FIG. 1 is a perspective view of a patch bay embodying the invention.
Figure 3:
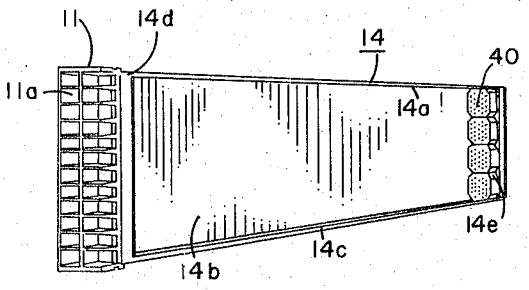
FIG. 3 is a perspective view of a base block and tray unit used in FIG. 1.
Figure 4:
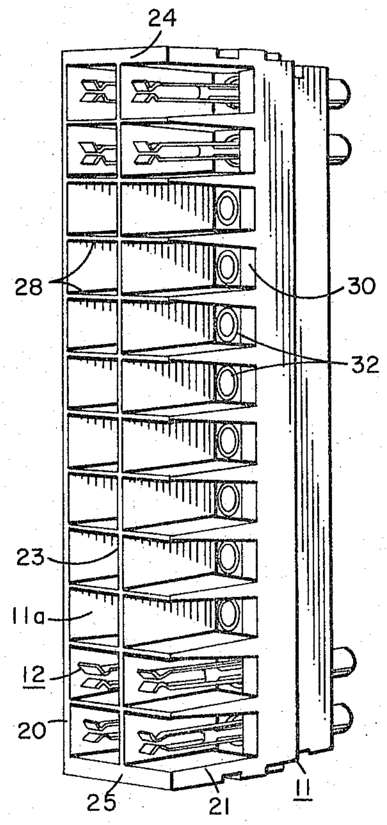
FIG. 4 is a perspective view of a base block shown in FIGS. 1–3.
Figure 5:
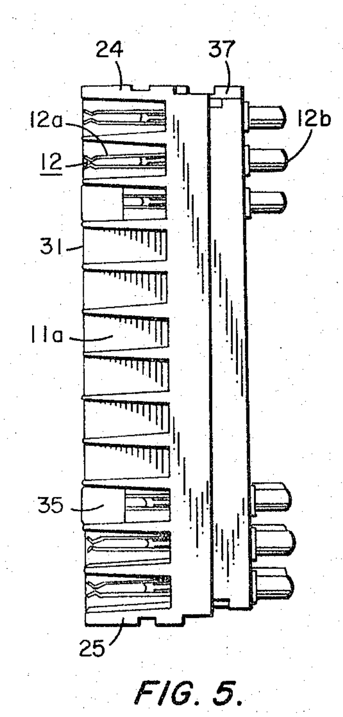
FIG. 5 is a side view of the base block of FIG. 4.
Figure 6:
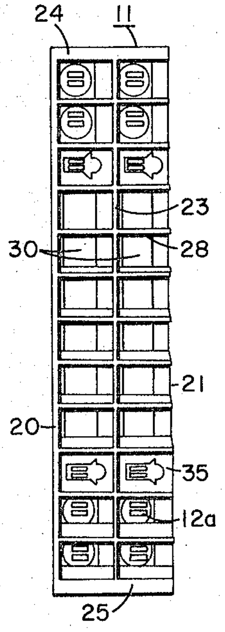
FIG. 6 is a front view of the base block of FIG. 4.
Figure 7:
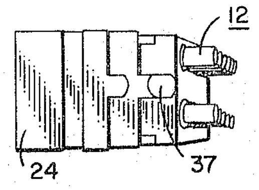
FIG. 7 is a top view of the base block of FIG. 4.

Referring now to FIG. 1 there is shown a complete patch bay 10 formed by a plurality of multicavity base blocks 11. The multicavity base blocks 11 together form a honeycomb each having a plurality of cavities or recesses 11*a* and within each recess may be disposed a contact spring assembly 12. The front faces of each of the base blocks 11 form a straight vertical plane and secured to the rear portion of each of the blocks 11 is a tray 14, FIG. 3, with each tray depending rearwardly of the plane of the patch bay.

Figure 2:
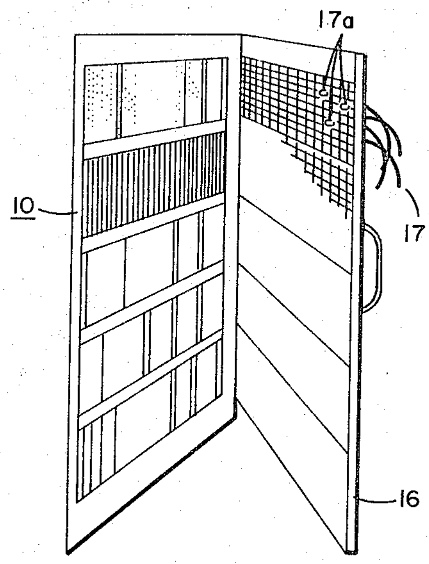
FIG. 2 is a perspective view of the patch bay of FIG. 1 together with a prepatch panel.

As shown in FIG. 2 a prepatch panel 16 is loaded with patch cords 17 preferably away from the computer area and then brought to the patch bay for plugging the "programmed" prepatch panel 16 into the patch bay 10. The rear of panel 16 is shown and the patch cords 17 are plugged into the front of the panel so that their pin contacts or tips 17*a* extend out of the rear of panel 16. Panel 16 is then placed in alignment with patch bay 10 with each of the patch cord tips 17*a* extending into a corresponding recess 11*a* and to the right of but not touching the associated contact assembly 12. The prepatch panel 16 is then moved to the left by means of a lever assembly or motor drive (not shown) a sufficient distance so that each of the patch cord tips 17*a* is fully engaged by its associated contact assembly 12.

It will be understood that a substantially large magnitude of force is necessary to move the patch bay to the left to produce engagement of the patch cord tips 17*a* as many thousands of tips may be used, only the portion of which are shown. Accordingly it is very important that each of the patch cord tips 17 be exactly aligned with the center of engagement of its associated contact or connector assembly 12 or as the tips 17*a* move to the left they will damage or break their associated contact assemblies 12.

In accordance with the invention the foregoing close tolerances are provided as well as the mechanical protection or shielding of the spring contacts 12 from accidental damage by the computer operators and repair personnel. In addition, electrical shielding is provided between assemblies 12. To achieve these purposes, as shown in FIGS. 4–7, the base block 11 is made of a single zinc die casting having the following configuration. The block has two relatively long longitudinal or side edges 20 and 21 with a longitudinal wall 20 formed across one longitudinal edge and with the other longitudinal edge 21 being unwalled. Midway between the longitudinal wall 20 and the longitudinal edge 21 there is formed a relatively long longitudinal divider 23. The block 11 is further formed to have two relatively short transverse or end walls 24 and 25 across each transverse edge. Between the transverse walls 24 and 25 there are formed a plurality of equally spaced transverse or lateral dividers 28 which are shown as tapered in order to provide for casting requirements. Thus, by means of longitudinal and transverse walls and dividers there are formed a plurality of pockets, recesses, or shielding connecting spaces 11a.

The base block 11 has a front surface 30 and this front surface defines the back wall of each of the recesses 11a. The front face 31 of the block 11, which is the front face of the recesses 11a, all end in the same plane which is substantially parallel to the back wall 30. As previously described the front face of each of the multicavity blocks 11 are in the same plane in the patch bay 10.

Extending through the back wall 30 of the multicavity base block 11 are apertures 32, one aperture for each recess 11a. Each of the apertures 32 is adapted to receive a respective spring contact assembly 12 and has flat or polarized portions to engage corresponding portions of that assembly to prevent it from turning within the aperture. The contact assembly 12 extends out of the back of the block 11 to form the connector portion 12b of the assembly 12. In addition the assembly 12 has its leaf spring or spring arm members 12a disposed within and extending into the cavity or recess 11a but not extending beyond the front face 31. The spring members 12a may be flush with the face 31 or slightly recessed in. In this manner the spring arm members 12a are totally enclosed within the recesses 11a and thus are mechanically protected from the front as well as from the side from accidental damage by the computer operator and repairman.

Each of the spring arms 12a of assembly 12 is centered between adjacent or successive transverse dividers 28 or between a transverse divider 28 and a transverse wall 24 or 25. In addition each of the springs 12a is adapted to be disposed off center to the left, for example, between the longitudinal divider 23 and the longitudinal wall 20 or between the longitudinal divider 23 and the longitudinal unwalled or open edge 21. Each of the contact assemblies 12 in each of the blocks 11 of the patch bay 10 is displaced in the same direction and by the same amount. It will be understood that this positioning is quite critical since the patch cord tips 17a prepatched in panel 16, FIG. 2, must be initially in a position to the right of the assemblies 20. When the patch panel 16 is moved to the left each of the patch cord tips 17a must engage contact assembly 12 and be positioned exactly between the spring arms 12a. Thus, the patch cord tip 17a must be in exact alignment with the center of the contact assembly 12. In this manner assemblies 12 are positioned within the recesses 11a so that they do not touch the wall 20 or divider 23 on their left hand side. On their right hand side assemblies 12 are positioned to provide sufficient space to initially receive respective patch cord tips or pin contacts 17a without their touching the longitudinal divider 23.

In order further to achieve proper initial alignment of the patch cord tips 17a there may be provided plastic insulator boxes 35 disposed within the upper portion of each of the recesses 11a. Each of boxes 35 are rectangular in shape, hollow on the inside and having an open end facing toward each assembly 12. At the side of a block 35 opposite to the open end there is a circular opening disposed to the right of its associated contact spring 12a adapted to receive a tip 17a. To the left of the circular opening of the block 35 the opening forms into a rectangular opening so that as the prepatch panel 17 carrying tips 17a is moved to the left the block 35 provides an opening for the tips 17a. It will be understood that the patch cord tips 17a may be plugged into the panel 16 after it has been placed in its operative position. The tip 17a would then pass through the panel 16 and the rectangular opening in block 35 to directly engage contact 12.

As previously described as each of the multicavity base blocks 11 have secured thereto a tray which is adapted to carry the computer circuit elements which are electrically connected to the terminal portions 12b of contacts 12. Specifically the tray 14 may be formed of three sides 14a–14c with the sides 14a and 14c substantially extending rearwardly from the walls 24 and 25 respectively, and the side 14b extending rearwardly from the wall 20. The front end of tray 14 is secured to the outer rear portion of the body block 11 by means of crimping or by screws (not shown). The other end 14e of the tray 14 has mounted therein connectors 40 electrically connected to the computer circuits and which may be plugged into corresponding connecters secured to the structure of the computer. Within the tray 14 there may be disposed differing computer circuit elements (not shown) such as amplifiers, multipliers, integraters, etc. A guide projection 37 is formed in each of walls 24 and 25 and is adapted to engage a track 10a depending rearwardly of the patch bay 10 and perpendicular thereto and supported by and secured to computer structure memberse such as members 10b. Thus, block 11 and its associated tray 14 may be easily removed as a unit from the patch bay 10. In this manner a block-tray unit as a "module" may be inserted or removed by way of the patch bay which forms the front of the computer. Accordingly repair work may be easily carried out and units added by the computer operator from the front of the computer and after all of the trays 14 have been inserted the patch bay is ready for immediate operation.

With the blocks 11 mounted side by side in the patch bay 10, it will be understood that the open or unwalled longitudinal edge 21 of a block mates with the walled edge 20 of an adjacent block. Thus the resultant effect is a honeycomb having a plurality of recesses 11a with each recess having four walls.

The blocks 11 may be plated with a highly electrically conductive coating. The blocks are then grounded by way of the track 10a, metal horizontal supporting members 10b and a metal vertical supporting members 10c of the computer structure.

It will now be understood in accordance with the invention by the use of blocks 11 there is achieved electrical shielding of the connecter assemblies 12 one from the other as well as substantially complete mechanical protection of the contact springs 12a. In addition by the use of blocks 11 in a patch bay system where each of the blocks 11 and an associated tray 14 are individually aligned by way of members 10b and 10c and tracks 10a there is achieved a high degree of tolerance in aligning the centers of the contact assemblies 12 with the respective patch cord tips 17a. This high degree of tolerance in alignment is achieved from one end of the patch bay to the other with relation to the tips 17a in the prepatch panel 16.

While only one embodiment of the invention is described it will be understood to those skilled in the art that other embodiments may be employed within the scope of the following claims.

What is claimed is:

1. A computer tray arrangement having secured to its front end a base block including a plurality of contact members comprising at least one computing circuit means disposed within said tray and connected to a selected one of said contact members, at least one longitudinal wall formed across a longitudinal edge of said base block, at least one longitudinal divider formed between the longitudinal edges of said base block, a transverse wall formed across each of the transverse edges of said base block, at least one transverse divider substantially equally spaced and formed between said transverse walls thereby forming a plurality of recesses in said base block, said dividers and walls being electrically conductive, and means for fixedly mounting a respective one of said contact members within each of said recesses thereby to provide for the alignment of the contact members one with the other and for the mechanical and electrical shielding of said contact members within said recesses.

2. The tray arrangement of claim 1 in which said recesses form a front face of said base block and in which said contact members are recessed within said recesses out of the plane of said front face.

3. The tray arrangement of claim 1 in which said contact members are disposed in said recesses transversely off center in a transverse direction to allow space in each of said recesses for an associated patch cord tip.

4. A computer patch bay formed of a plurality of multi-cavity base blocks disposed adjacent each other and each receiving contact members adapted to engage patch cord tips disposed in a prepatch panel comprising at least one computing circuit means for each of said base blocks including connections to selected ones of the contact members of its associated base block, each of said base blocks having only one longitudinal wall formed across one of the longitudinal edges of said block, the other of said longitudinal edges being open and at least one longitudinal divider formed between the longitudinal edges of said block and equally spaced therebetween, each of said base blocks having a transverse wall formed across each transverse edge of said block and at least one transverse divider formed between said transverse walls thereby to form cavities in said base block, said walls and dividers being electrically conductive, and means securing a selected one of said contact members within each of said cavities whereby said contact members are electrically and mechanically protected in said cavities and said contact members in differing base blocks are exactly aligned one with the other in said patch bay and with respective patch cord tips in said prepatch panel.

5. The patch bay of claim 4 in which the open longitudinal edge of each base block is disposed adjacent the longitudinal wall of a next succeeding base block.

6. The patch bay of claim 4 in which an outer surface of said cavities form a front face of the base block and in which said contact members are recessed within their respective cavities at least flush with said front face.

7. The patch bay of claim 4 in which there is provided a computer structure and in which said base blocks are formed of metal and electrically grounded to said computer structure.

8. The patch bay of claim 4 in which said contact members are disposed in said cavities off center in a transverse direction to allow space in each of said recesses for an associated patch cord tip.

References Cited by the Examiner

UNITED STATES PATENTS

| | | | |
|---|---|---|---|
| 2,561,426 | 7/1951 | Stearn et al. | 317—99 X |
| 2,963,577 | 12/1960 | Errichiello et al. | 317—101 X |
| 3,176,261 | 3/1965 | Greco et al. | 339—176 |
| 3,202,878 | 8/1965 | Rolph et al. | 317—99 |

ROBERT K. SCHAEFER, *Primary Examiner.*

M. GINSBURG, *Assistant Examiner.*